US011852073B2

(12) United States Patent
Dobson et al.

(10) Patent No.: US 11,852,073 B2
(45) Date of Patent: Dec. 26, 2023

(54) ORIFICE PACK FOR COMPRESSOR BLEED VALVE

(71) Applicant: PRATT & WHITNEY CANADA CORP., Longueuil (CA)

(72) Inventors: Martin Dobson, Brossard (CA); Oleg Iskra, Oakville (CA); Michael Fryer, Oakville (CA); Marc Lavoie, Otterburn Park (CA); Ivan Sidorovich Paradiso, Toronto (CA); Louis Duranleau-Hendrickx, Montreal (CA); Domenico Di Florio, St-Lazare (CA); Tibor Urac, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 108 days.

(21) Appl. No.: 17/389,450

(22) Filed: Jul. 30, 2021

(65) Prior Publication Data

US 2023/0029960 A1    Feb. 2, 2023

(51) Int. Cl.
*F02C 6/08* (2006.01)
*B01D 45/04* (2006.01)

(52) U.S. Cl.
CPC .......... *F02C 6/08* (2013.01); *B01D 45/04* (2013.01); *F05D 2260/605* (2013.01); *F05D 2260/607* (2013.01)

(58) Field of Classification Search
CPC ........ B01D 45/02; B01D 45/04; B01D 45/06; F02C 6/08; Y10S 55/14

(Continued)

(56) References Cited

U.S. PATENT DOCUMENTS

| 408,787 A | * | 8/1889 | Ash | .................. | B01D 45/08 |
| | | | | | 55/455 |
| RE16,842 E | * | 1/1928 | Hampton | ............ | B01D 29/085 |
| | | | | | 210/473 |

(Continued)

FOREIGN PATENT DOCUMENTS

EP    1750012      10/2014
EP    3346109 A1    7/2018

(Continued)

OTHER PUBLICATIONS

European Search Report issued in couterpart application No. EP22188162.6 dated Dec. 19, 2022.

(Continued)

*Primary Examiner* — Todd E Manahan
*Assistant Examiner* — Marc J Amar
(74) *Attorney, Agent, or Firm* — NORTON ROSE FULBRIGHT CANADA LLP

(57) ABSTRACT

An orifice pack is provided for delivering pressurized air to a compressor bleed valve of a gas turbine engine. The orifice pack has a diffusion chamber in serial flow communication with a tapering passage and a first outlet passage for venting a first portion of the pressurized air from the diffusion chamber. A second outlet passage branches off from the diffusion chamber at an axial location between the inlet and the tapering passage. The second outlet passage is fluidly connected to the compressor bleed valve for directing a second portion of the pressurized air from the diffusion chamber to the compressor bleed valve.

18 Claims, 3 Drawing Sheets

(58) Field of Classification Search
USPC .......................................................... 95/39
See application file for complete search history.

(56) References Cited

U.S. PATENT DOCUMENTS

| | | | | |
|---|---|---|---|---|
| 2,047,568 A * | 7/1936 | Lissman | ................ | B01D 45/12 209/133 |
| 4,469,497 A * | 9/1984 | Linhardt | ................ | B01D 45/12 210/512.1 |
| 4,592,765 A * | 6/1986 | Breitman | ................... | F02C 7/05 55/306 |
| 5,549,721 A * | 8/1996 | Shchipachev | .......... | B01D 45/04 55/393 |
| 5,799,593 A * | 9/1998 | Belin | ..................... | B01D 45/08 55/444 |
| 6,733,554 B2 * | 5/2004 | Ribera Salcedo | ........ | B04C 7/00 55/467 |
| 8,572,985 B2 | 11/2013 | Waddleton | | |
| 10,267,430 B2 | 4/2019 | Simpson | | |
| 10,286,407 B2 | 5/2019 | Correia et al. | | |
| 10,512,876 B2 | 12/2019 | Mercier et al. | | |
| 10,824,172 B1 | 11/2020 | DeFelice et al. | | |
| 11,008,889 B2 | 5/2021 | Ratzlaff et al. | | |
| 2002/0066366 A1 * | 6/2002 | Conrad | ..................... | B04C 5/24 95/57 |
| 2003/0075048 A1 * | 4/2003 | Jordan, Sr. | ............. | B01D 45/10 95/285 |
| 2008/0178571 A1 | 7/2008 | So et al. | | |
| 2009/0139191 A1 * | 6/2009 | Roundy | .................. | F02C 7/052 55/392 |
| 2010/0326090 A1 * | 12/2010 | Waddleton | ................ | F02C 9/18 60/785 |
| 2014/0013767 A1 | 1/2014 | Bohney | | |
| 2014/0298788 A1 | 10/2014 | Blaney et al. | | |
| 2015/0096641 A1 * | 4/2015 | Chow | .................... | G05D 7/012 138/45 |
| 2015/0211417 A1 * | 7/2015 | Yamaguchi | ............... | F02C 7/22 60/39.465 |
| 2018/0340474 A1 | 11/2018 | Baladi | | |
| 2019/0309683 A1 | 10/2019 | Mackin | | |
| 2020/0025005 A1 | 1/2020 | Dunnigan | | |
| 2020/0284161 A1 | 9/2020 | Lefebvre et al. | | |
| 2021/0246832 A1 | 8/2021 | Tu | | |

FOREIGN PATENT DOCUMENTS

| | | |
|---|---|---|
| EP | 3626942 | 10/2021 |
| FR | 3027973 | 5/2016 |
| JP | 2000104547 | 4/2000 |
| RU | 2109971 | 4/1998 |

OTHER PUBLICATIONS

European Search Report issued in related application No. 22196382.0 dated Feb. 24, 2023.

* cited by examiner

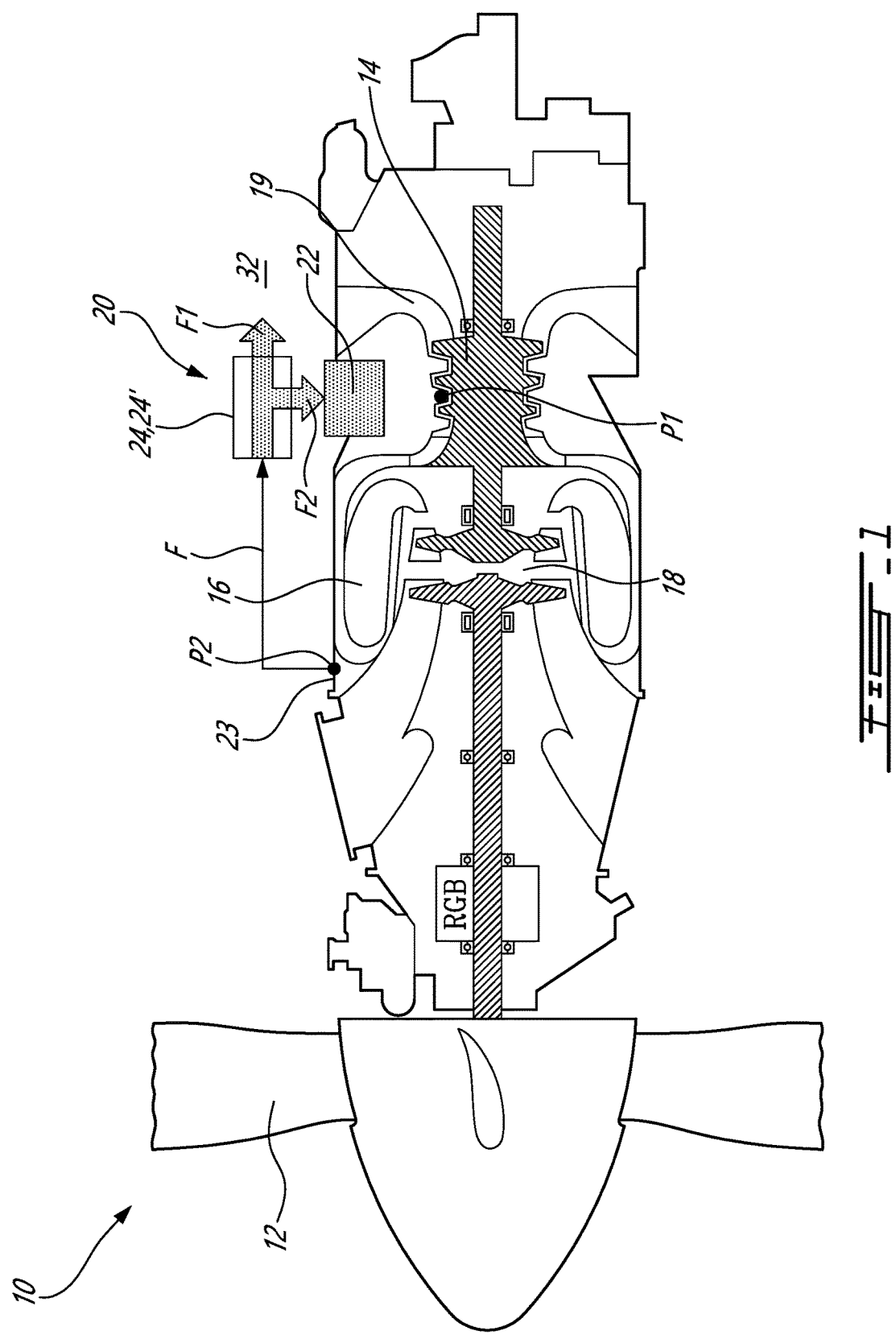

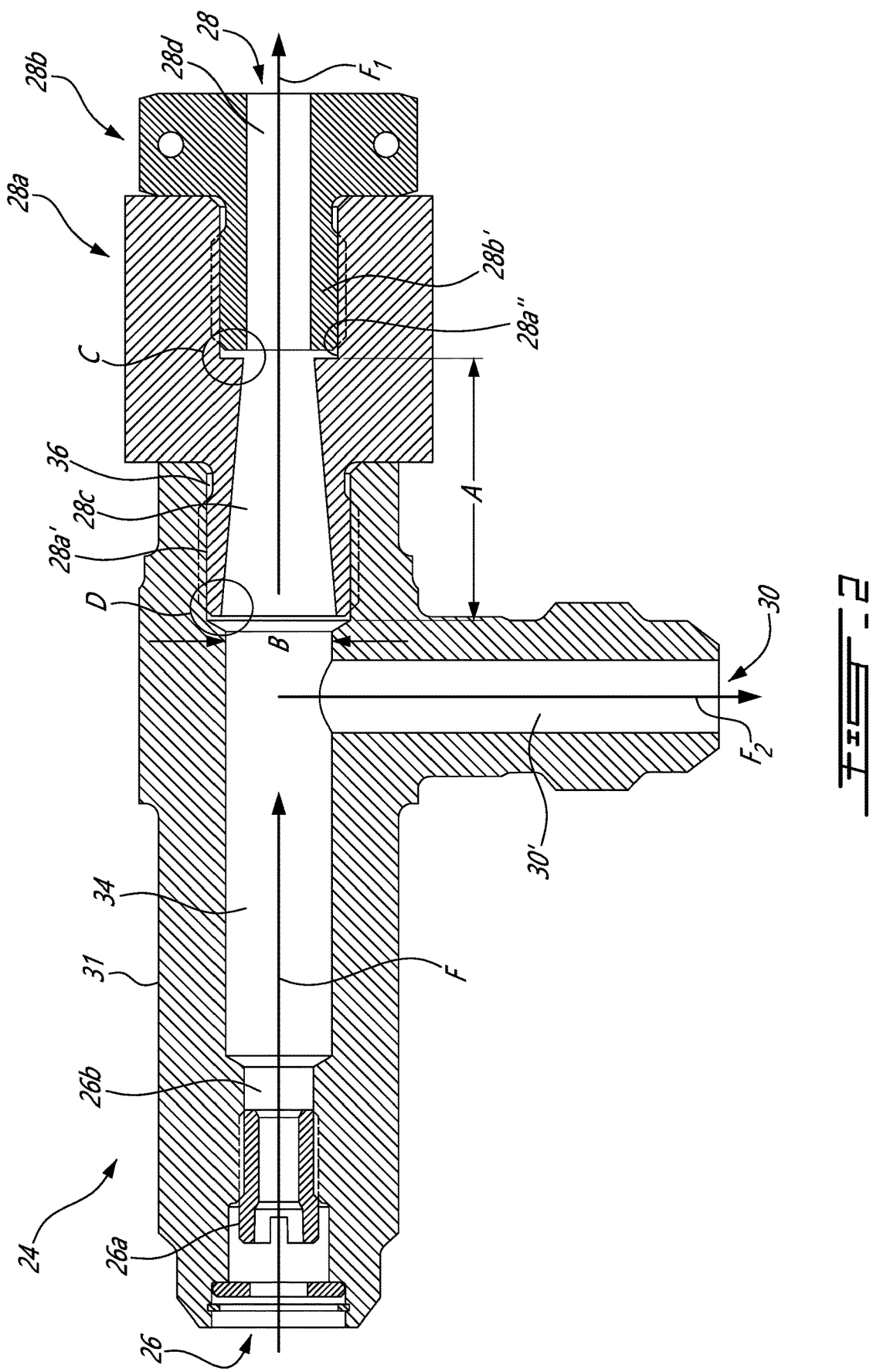

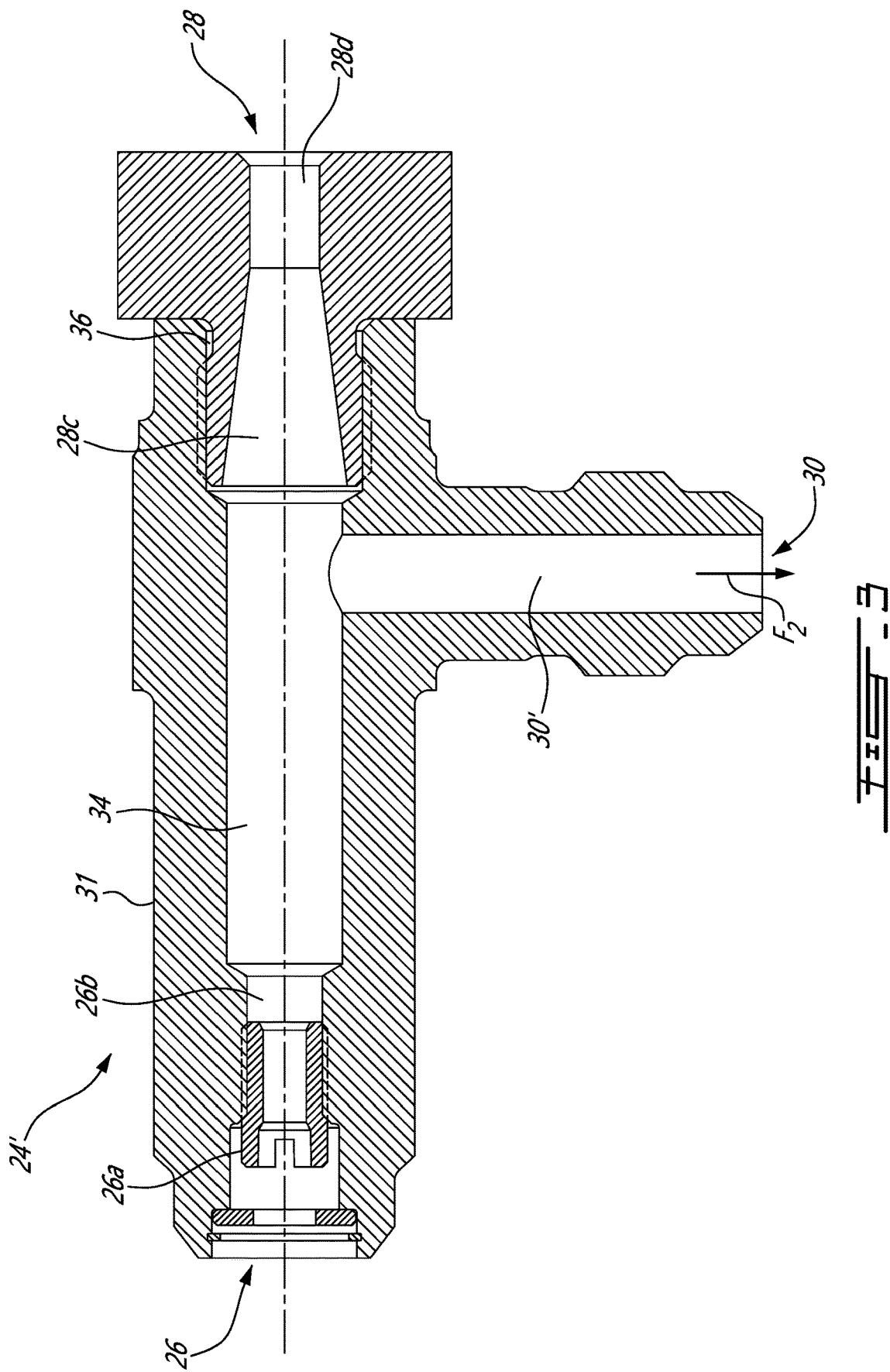

US 11,852,073 B2

ORIFICE PACK FOR COMPRESSOR BLEED VALVE

TECHNICAL FIELD

The disclosure relates to gas turbine engines and, more particularly, to an air system for providing pressurized air to a compressor bleed valve.

BACKGROUND OF THE ART

In an aerospace gas turbine engine, pressurized air may be used to control the operation of a pneumatically-operated compressor bleed valve that may be selectively opened and closed to maintain the operability of the gas turbine engine. Depending on the operating conditions of the gas turbine engine and on the source of the pressurized air, some debris could potentially be carried by the pressurized air and the presence of such debris in the pressurized air delivered to the compressor bleed valve may not be desirable.

SUMMARY

In one aspect, there is provided an orifice pack for delivering pressurized air to a compressor bleed valve, the orifice pack comprising: a body defining a diffusion chamber extending along a central axis, the diffusion chamber having an inlet fluidly connectable to a source of pressurized air; a vent removably mounted to the body, the vent having a tapering passage, the diffusion chamber and the tapering passage aligned longitudinally and sequentially along the central axis when the vent is mounted to the body, the tapering passage converging towards a first outlet passage in an axial direction away from the diffusion chamber for venting a first portion of the pressurized air from the diffusion chamber; and a second outlet passage branching off from the diffusion chamber at an axial location between the inlet and the tapering passage, the second outlet passage fluidly connectable to the compressor bleed valve for directing a second portion of the pressurized air from the diffusion chamber to the compressor bleed valve.

In another aspect, there is provided a compressor bleed valve arrangement for selectively bleeding air from a compressor, the compressor bleed valve arrangement comprising: a pneumatically-operable compressor bleed valve having a control port; and an orifice pack fluidly connected to the control port of the pneumatically-operable compressor bleed valve, the orifice pack including: a conduit having a central axis and including: an inlet fluidly connectable to a source of pressurized air, the inlet defining a first constriction; a first outlet for releasing a first portion of the pressurized air from the conduit, the first outlet defining a second constriction; a diffusion chamber extending axially from the first constriction towards the second constriction; a tapering passage extending axially from the diffusion chamber to the second constriction, the tapering passage converging towards the central axis in an axial direction away from the inlet; and a second outlet for releasing a second portion of the pressurized air from the diffusion chamber, the second outlet disposed axially at a downstream end of the diffusion chamber adjacent to the tapering passage, the second outlet fluidly connected to the control port of the pneumatically-operable compressor bleed valve.

In a further aspect, there is provided a gas turbine engine comprising: a compressor for pressurizing air; a combustor in which the pressurized air is mixed with fuel and ignited for generating a stream of combustion gas; a turbine for extracting energy from the combustion gas, the compressor, the combustor and the turbine being operatively disposed along a gas path of the gas turbine engine; a pneumatically-operable compressor bleed valve for bleeding pressurized air from the compressor; and an orifice pack for pneumatically controlling an operation of the compressor bleed valve, the orifice pack including: a conduit having a central axis and including: an inlet for receiving a quantity of bleed air extracted from the gas path downstream of the compressor bleed valve, the inlet defining a first constriction; an outlet for releasing a first portion of the bleed air from the conduit, the outlet defining a second constriction; a diffusion chamber extending axially from the first constriction towards the second constriction; a tapering passage extending axially from the diffusion chamber to the second constriction, the tapering passage converging towards the central axis in an axial direction away from the inlet; and a control air outlet for releasing a second portion of the bleed air from the diffusion chamber, the control air outlet disposed axially at a downstream end of the diffusion chamber adjacent to the tapering passage and fluidly connected to the pneumatically-operable compressor bleed valve.

DESCRIPTION OF THE DRAWINGS

Reference is now made to the accompanying figures in which:

FIG. 1 is a schematic axial cross-section view of an exemplary gas turbine engine including a system for delivering pressurized air to a control port of a compressor bleed valve of the gas turbine engine, as described herein;

FIG. 2 is a schematic axial cross-section view of an embodiment of an orifice pack for feeding air to the compressor bleed valve; and FIG. 3 is a schematic axial cross-section view of another embodiment of the orifice pack.

DETAILED DESCRIPTION

The following description discloses systems and methods for feeding pressurized air to a pneumatically-operated compressor bleed valve of a gas turbine engine. In some situations, venting a portion of the pressurized air upstream of the compressor bleed valve may prevent some of the debris carried by the pressurized air from being delivered to the compressor bleed valve. In some situations, ejecting contaminants from the stream of pressurized air upstream of the compressor bleed valve may promote reliability and consistency in the operation of the compressor bleed valve.

The term "connected" may include both direct connection (in which two elements contact each other) and indirect connection (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

FIG. 1 illustrates an exemplary gas turbine engine 10 (referred hereinafter as "engine 10"), which may be of a type preferably provided for use in subsonic flight of an aircraft. Engine 10 may comprise, in serial flow communication, propeller 12 through which ambient air is propelled, compressor 14 for pressurizing the air, combustor 16 in which the compressed air is mixed with fuel and ignited for generating an annular stream of hot combustion gases, and turbine section 18 including one or more turbines for extracting energy from the combustion gases. Compressor 14 of engine 10 may be a multi-stage compressor, and thus may comprise a plurality of axial and/or centrifugal compressor stages. Compressor 14, combustor 16 and turbine section 18 may be operatively disposed along gas path 19 of engine 10. In some embodiments, engine 10 may be a reverse-flow turboprop gas turbine engine. Even though FIG. 1 illustrates a turboprop engine, it is understood that the systems and methods described herein may be incorporated into other types of engines including engines of the turbofan and turboshaft type. It is also understood that the systems and methods described herein may be incorporated into aircraft and ground-based gas turbine engine applications.

Engine 10 may include a system 20 for feeding pressurized air that is used as "muscle air" to control a function of a compressor bleed valve 22 (referred hereinafter as "bleed valve 22") of engine 10. Bleed valve 22 may be pneumatically-operated and may be opened to release air from compressor 14 to ambient environment 32. Bleed valve 22 may be opened to relieve pressure in a portion of gas path 19 at a stage of compressor 14. Bleed valve 22 may be a poppet valve having a hole, usually round or oval and a tapered plug, usually a disk shape on the end of a shaft. The shaft may guide the plug portion by sliding through a valve guide. A pressure differential may be used to seal the valve and, under certain operating conditions, open the valve. In some embodiments, bleed valve 22 may be similar to the type of air bleed valve disclosed in U.S. Pat. No. 8,572,985 B2 (titled: AIR FILTRATION SYSTEM FOR GAS TURBINE ENGINE PNEUMATIC SYSTEM), which is incorporated herein by reference. System 20 may receive pressurized air from gas generator casing 23 of engine 10 and may distribute the pressurized air between bleed valve 22 and ambient environment 32 (e.g. atmosphere) as explained below.

The function of bleed valve 22 may be controlled by forces acting on opposite sides of bleed valve 22 which may relate to the respective air pressures P1, P2 at different locations along gas path 19. In some embodiments of bleed valve 22, a spring may be provided to bias bleed valve 22 toward the open or closed position. In reference to FIG. 1, pressure P1 may be taken in gas path 19 at an intermediate stage of compressor 14, and P2 may be taken in gas path 19 downstream of the location of P1. For example, pressure P2 may be taken downstream of compressor 14 and upstream of combustor 16 so that pressure P2 may be higher than pressure P1. Pressure P2, or another pressure indicative thereof, may be acquired via bleed air taken from gas path 19 at the desired location along gas path 19. The system 20 comprises an orifice pack 24, 24' configured for delivering "cleaned/decontaminated" bleed air to the bleed valve 22. In some embodiments, pressure P2 may be taken at a location along gas path 19 providing the highest pressure within engine 10. Changes in the P1/P2 pressure relationship may cause bleed valve 22 to move between the open and closed positions. During operation of engine 10, bleed valve 22 may be controlled by P1/P2 to maintain the operability of engine 10. In some situations, bleed valve 22 may, for example, prevent compressor stall at relatively low operating speeds of engine 10.

FIG. 2 illustrates an exemplary embodiment of the orifice pack 24. The orifice pack 24 may be provided in the form of a fitting including a vent for discharging contaminants/particles carried by the pressurized air into the ambient environment 32. Conceptually, it can be said that the orifice pack 24 is a conduit including an inlet 26 for receiving the pressurized (e.g., bleed) air F, a first outlet (e.g. a contaminated air outlet) 28 for releasing a first portion F1 of pressurized air F from conduit, and a second outlet (e.g. a clean air outlet) 30 for releasing a second portion F2 of pressurized air from the conduit. First portion F1 and second portion F2 of pressurized air F may be different from each other so that F=F1+F2. Typically, the conduit is configured so that a main portion of the pressurized air F is discharged through the first outlet 28 (F1>F2). The first portion F1 is vented into the atmosphere 32 and the second portion F2 is directed to the pneumatically-actuated bleed valve 22. In some embodiments, the inlet 26 and the first outlet 28 are axially aligned along a central axis of the conduit and the second outlet 30 is disposed axially therebetween and oriented along a direction intersecting the central axis. In some embodiments, the inlet 26 and the first and second outlets 28, 30 may be sized to provide a desired flow rate and pressure drop across each of the inlet orifice and the outlet orifices. Such sizing may be based on specific operating parameters of engine 10 and the desired operating behaviour of bleed valve 22. As will be seen hereinafter, the inlet 26 and/or the outlets 28, 30 may include replaceable inserts to facilitate the use of orifice packs of similar configurations on different engines.

In some embodiments, the orifice pack 24 is provided in the form of a "tee" having a body 31 including a primary branch defining a diffusion chamber 34 between inlet 26 and the first outlet 28 and a secondary branch branching off at right angles from the primary branch at an axial location of the body 31 generally corresponding to a downstream end of the diffusion chamber 34. The secondary branch defines an outlet passage 30' extending through the wall of the diffusion chamber 34 in the primary branch. The secondary branch fluidly connects the diffusion chamber 34 to the second outlet 30, which is, in turn, connected in fluid communication to a control port of the bleed valve 22.

The diffusion chamber 34 is configured for reducing the velocity and increasing the static pressure of the air passing through the system 20. According to some embodiments, the diffusion chamber 34 may have a cylindrical configuration, including a constant circular cross-sectional area.

In some embodiments, inlet 26 may include an inlet orifice defining a constriction (i.e., narrowing or reduced cross-sectional area of the available flow passage) relative to the diffusion chamber 34. In some embodiments, the inlet 26 may include an orifice insert 26a adapted to be removably installed in a central inlet bore 26b of body 31. For instance, the orifice insert 26a may be threadably engaged with an internally threaded portion of the inlet bore 26b. In this way, a set of differently calibrated orifice inserts offering different flow cross-sectional areas may be selectively installed at the inlet end of the body 31 according to the flow parameters of the intended application.

As illustrated in FIG. 2, the first outlet 28 may be provided in the form of a vent detachably mounted to an end of the body 31 axially opposite to inlet 26. According to the exemplary embodiment shown in FIG. 2, the vent is a two-piece body including a tapered extension piece 28a and an outlet orifice piece 28b. As will be seen hereinafter, the tapered extension piece 28a improves the orifice pack's ability to eject contamination to provide cleaner air to the bleed valve 22 when fed high pressure air from the gas generator section 23.

Still referring to FIG. 2, it can be appreciated that the tapered extension piece 28a defines a tapering passage 28c. The outlet orifice piece 28b defines a first outlet passage 28d. The tapering passage 28c and the first outlet passage 28d are axially aligned in serial flow communication when the two pieces of the vent are assembled to one another. Likewise, the diffusion chamber 34 and the tapering passage 28c are aligned longitudinally and sequentially along the central axis of the primary branch of the orifice pack 24 when the extension piece 28a is mounted to the body 31. The tapering passage 28c converges towards the central axis in an axial direction away from the diffusion chamber 34 (i.e. passage 28c tapers in a downstream direction relative to a flow of air through the orifice pack 24) for venting the first portion F1 of the pressurized air F from the diffusion chamber 34. The tapering passage 28c helps the contaminants travel to the first outlet passage 28d without bouncing back, thereby improving the orifice pack's ability to eject contaminants carried in the air through the outlet passage 28d of the vent. This reduces the chances of contaminants travelling through the second outlet 30 and into the bleed valve 22. The extension piece 28a also moves the outlet orifice of the vent further downstream from the secondary outlet 30 (i.e. the clean air outlet), which may also improve particle separation.

As shown in FIG. 2, the diffusion chamber 34 has a diameter (B) and the tapering passage 28c has a length (A) along the central axis. According to at least some embodiments of system 20, a useful range of taper sizes has been determined to be: 1≤A/B≤4. However, it is understood that other ranges may be suitable depending on the intended application.

Sill referring to FIG. 2, it can be appreciated that the tapering passage 28c has a cross-sectional area at an inlet end that is at least equal to that of the diffusion chamber so as to avoid the presence of a flow constriction at the interface D between the diffusion chamber 34 and the downstream tapering passage 28c. The relative sizing of the cross-sectional area of the diffusion chamber 34 and the tapering passage 34 is selected to eliminate a protrusion into the gas path that could interfere with the contamination particles travelling towards the outlet passage 28d.

According to one or more embodiments, the taper extension piece 28a is threadably mounted to the body 31. According to the embodiment shown in FIG. 2, the body 31 has a connecting end axially opposite to the inlet 26, the connecting end defining and internally threaded bore 36 around the central axis of the primary branch of the body 31 at the outlet end of the diffusion chamber 34. The internally threaded bore 36 has a diameter greater than that of the diffusion chamber 34 to accommodate the extension piece 28a. The taper extension piece 28a has a male end 28a' with external threads for threaded engagement with the internally threaded bore 36 of the body 31, thereby allowing the extension piece 28a to be detachably mounted in series with the diffusion chamber 34. The internally threaded bore 36 and the male end 28a' of the extension piece 28a are sized so that the male end 28a' of the extension piece 28a does not protrude radially inwardly relative to the diffusion chamber 34.

Like extension piece 28a, the outlet orifice piece 28b has an externally threaded end 28b' threadably engageable with complementary internal threads of a threaded bore 28a'' defined at an end of the extension piece 28a opposite to its male end 28a'. The interface C between the downstream end of the extension piece 28a and the outlet orifice piece 28b is sized to minimize steps and gaps that could interfere with the flow of contamination particles. A minimal step can, however, be intentionally provided between the tapered extension piece 28*a* and outlet orifice piece 28*b* to help the entire orifice pack assembly continue to produce the necessary pressure for the bleed valve 22.

According to the embodiment shown in FIG. 2, it can be appreciated that the first outlet passage 28*d* has a cross-sectional area which is slightly smaller than the cross-sectional area at an outlet end of the tapering passage 28*c*, thereby providing for a flow constriction at interface C between the tapering passage 28*c* and the first outlet passage 28*d*.

FIG. 3 illustrates another embodiment which essentially differs from the embodiment shown in FIG. 2 in that the vent has a monolithic body. Indeed, according to this embodiment, the taper extension piece incorporate the secondary orifice feature, thereby reducing the number of parts in the assembly compared to the arrangement described above with reference to FIG. 2. According to this embodiment, the cross-sectional area of the first outlet passage 28*d* is equal to the cross-sectional area at the outlet end of the tapering passage 28*c*.

In operation, the orifice pack 24, 24' channels the high-pressure air through the inlet 26 into the diffusion chamber 34 from which a first portion F1 of the air vents to atmosphere 32 through the tapering passage 28*c* and the first outlet passage 28*d*. A second portion F2 of the air is tapped from the downstream end of the diffusion chamber 34 just upstream of the tapering passage 28*c* and fed to the bleed valve 22 via the second outlet 30. Any contamination taken from the gas generator case 23 will pass through the orifice pack inlet 26 and the major part will vent to atmosphere 32 through the first outlet 28. The tapering passage 28*c* extending axially in continuity from the diffusion chamber 34 will help the contamination particles carried by the air to flow toward the first outlet passage 28*b*, thereby reducing the chances of contaminants travelling to the bleed valve 22 via the second outlet 30.

The embodiments described in this document provide non-limiting examples of possible implementations of the present technology. Upon review of the present disclosure, a person of ordinary skill in the art will recognize that changes may be made to the embodiments described herein without departing from the scope of the present technology.

The invention claimed is:

1. An orifice pack for delivering pressurized air to a compressor bleed valve, the orifice pack comprising:

a body defining a diffusion chamber extending along a central axis, the diffusion chamber having an inlet fluidly connectable to a source of pressurized air, the diffusion chamber having a main cylindrical portion bounded by an inner wall of the body, the main cylindrical portion having a diameter (B);

a vent removably mounted to the body, the vent having a tapering passage, the diffusion chamber and the tapering passage aligned longitudinally and sequentially along the central axis when the vent is mounted to the body, the tapering passage converging towards a first outlet passage in an axial direction away from the diffusion chamber for venting a first portion of the pressurized air from the diffusion chamber, wherein the vent has an upstream end including an axially facing end surface having a radially innermost edge bordering an inlet of the tapering passage, the inlet of the tapering passage having a diameter greater than the diameter (B) of the main cylindrical portion of the diffusion chamber; and a second outlet passage branching off from the diffusion chamber at an axial location between the inlet and the tapering passage, the second outlet passage fluidly connectable to the compressor bleed valve for directing a second portion of the pressurized air from the diffusion chamber to the compressor bleed valve.

2. The orifice pack according to claim 1, wherein the tapering passage has a length (A) along the central axis, and wherein

1≤A/B≤4.

3. The orifice pack according to claim 1, wherein the vent has a threaded end threadably engaged with the body.

4. The orifice pack according to claim 3, wherein the body has a connecting end axially opposite to the inlet of the diffusion chamber, the connecting end defining an internally threaded bore around the central axis, the internally threaded bore having a diameter greater than that of the diffusion chamber, and wherein the threaded end of the vent has external threads for threaded engagement with the internally threaded bore of the body.

5. The orifice pack according to claim 4, wherein the internally threaded bore and the threaded end of the vent are sized so that the threaded end of the vent does not protrude radially inwardly relative to the main cylindrical portion of the diffusion chamber.

6. The orifice pack according to claim 1, wherein the first outlet passage has a cross-sectional area which is smaller than a cross-sectional area at an outlet end of the tapering passage so as to define a flow constriction at an interface between the tapering passage and the first outlet passage.

7. The orifice pack according to claim 1, wherein the vent has a two-piece body including first and second detachable pieces, the tapering passage and the first outlet passage respectively defined in the first and the second detachable pieces.

8. The orifice pack according to claim 7, wherein the second detachable piece has external threads for threaded engagement with corresponding internal threads provided on the first detachable piece.

9. The orifice pack according to claim 1, wherein the vent has a monolithic body, the tapering passage and the first outlet passage extending longitudinally in continuity axially through the monolithic body.

10. The orifice pack according to claim 1, wherein the second outlet passage is axially positioned adjacent to the tapering passage at a downstream end of the diffusion chamber.

11. The orifice pack according to claim 10, wherein the body is provided in the form of a T-shaped body, and wherein the second outlet passage is defined in a branch of the T-shaped body.

12. The orifice pack according to claim 1, wherein the inlet comprises a primary orifice insert removably mounted in a receiving bore defined in body, the primary orifice insert defining a first constriction.

13. A compressor bleed valve arrangement for selectively bleeding air from a compressor, the compressor bleed valve arrangement comprising:
a pneumatically-operable compressor bleed valve having a control port; and
an orifice pack fluidly connected to the control port of the pneumatically-operable compressor bleed valve, the orifice pack including:
a conduit having a central axis and including:
an inlet fluidly connectable to a source of pressurized air, the inlet defining a first constriction;
a first outlet for releasing a first portion of the pressurized air from the conduit, the first outlet defining a second constriction;
a diffusion chamber defined in a main body of the conduit, the diffusion chamber extending axially from the first constriction towards the second constriction, the diffusion chamber having a main cylindrical portion bounded by an inner wall of the body, the main cylindrical portion having a diameter (B);
a vent threadably mounted to the main body, the vent defining a tapering passage extending axially from the diffusion chamber to the second constriction, the tapering passage converging towards the central axis in an axial direction away from the inlet, the vent having an upstream end including an end surface having a radially innermost edge circumscribing an inlet of the tapering passage, the inlet of the tapering passage having a diameter greater than the diameter (B) of the main cylindrical portion of the diffusion chamber; and
a second outlet for releasing a second portion of the pressurized air from the diffusion chamber, the second outlet disposed at a downstream end of the diffusion chamber adjacent to and upstream of the tapering passage, the second outlet fluidly connected to the control port of the pneumatically-operable compressor bleed valve.

14. The compressor bleed valve arrangement according to claim 13, wherein the first outlet is part of the vent.

15. The compressor bleed valve arrangement according to claim 13, wherein the tapering passage has a length (A) along the central axis, and wherein 1≤A/B≤4.

16. The compressor bleed valve arrangement according to claim 14, wherein the inlet of the tapering passage has end having a cross-sectional area that is at least equal to a cross-sectional area of main cylindrical portion of the diffusion chamber to avoid a flow constriction at an interface between the diffusion chamber and the tapering passage.

17. The compressor bleed valve arrangement according to claim 14, wherein the conduit is a T-shaped conduit, and wherein the second outlet is provided in a branch branching off from the main body in a direction intersecting the central axis of the conduit.

18. A gas turbine engine comprising:
a compressor for pressurizing air;
a combustor in which the pressurized air is mixed with fuel and ignited for generating a stream of combustion gas;
a turbine for extracting energy from the combustion gas, the compressor, the combustor and the turbine being operatively disposed along a gas path of the gas turbine engine;
a pneumatically-operable compressor bleed valve for bleeding pressurized air from the compressor; and
an orifice pack for pneumatically controlling an operation of the compressor bleed valve, the orifice pack including:
a conduit having a central axis and including:
an inlet for receiving a quantity of bleed air extracted from the gas path downstream of the compressor bleed valve, the inlet defining a first constriction;
an outlet for releasing a first portion of the bleed air from the conduit, the outlet defining a second constriction;
a diffusion chamber defined in a main body of the conduit, the diffusion chamber extending axially from the first constriction towards the second constriction, the diffusion chamber having a main cylindrical portion bounded by an inner wall of the main body, the main cylindrical portion having a diameter (B);

a vent threadably mounted to the main body, the vent defining a tapering passage extending axially from the diffusion chamber to the second constriction, the tapering passage converging towards the central axis in an axial direction away from the inlet, the vent having an upstream end including an end surface having a radially innermost edge circumscribing an inlet of the tapering passage, the inlet of the tapering passage having a diameter greater than the diameter (B) of the main cylindrical portion of the diffusion chamber; and a control air outlet for releasing a second portion of the bleed air from the diffusion chamber, the control air outlet disposed axially at a downstream end of the diffusion chamber adjacent to the tapering passage and fluidly connected to the pneumatically-operable compressor bleed valve.

* * * * *